US 6,874,032 B2

(12) United States Patent
Gersht et al.

(10) Patent No.: US 6,874,032 B2
(45) Date of Patent: *Mar. 29, 2005

(54) METHOD AND SYSTEM FOR BURST CONGESTION CONTROL IN AN INTERNET PROTOCOL NETWORK

(75) Inventors: Alexander Gersht, Boston, MA (US); Girish Pathak, Sudbury, MA (US); Alexander Shulman, Weston, MA (US)

(73) Assignee: Verizon Laboratories Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/999,348

(22) Filed: Nov. 15, 2001

(65) Prior Publication Data

US 2002/0056007 A1 May 9, 2002

Related U.S. Application Data

(63) Continuation of application No. 09/141,941, filed on Aug. 27, 1998, now Pat. No. 6,405,257, which is a continuation-in-part of application No. 09/105,905, filed on Jun. 26, 1998, now abandoned.

(51) Int. Cl.[7] .............................................. G06F 15/16
(52) U.S. Cl. ..................... 709/235; 709/232; 709/233; 709/234; 709/235; 709/224; 709/225; 709/226; 709/229; 709/230; 709/238; 709/239; 370/229
(58) Field of Search ................................. 709/232–236, 709/224–226, 229–239; 370/229–236, 468, 395

(56) References Cited

U.S. PATENT DOCUMENTS

| 4,335,222 A | 6/1982 | Kamoi et al. .................. 370/60 |
| 5,029,164 A | * 7/1991 | Golstein et al. ............ 370/235 |

(Continued)

OTHER PUBLICATIONS

Alexander Gersht and Alexander Shulman, "Optimal Routing in Circuit Switched Communication Networks," IEEE Transactions on Communications, vol. 37, No. 11, Nov. 1989.

(Continued)

Primary Examiner—Jack B. Harvey
Assistant Examiner—Hieu Le
(74) Attorney, Agent, or Firm—Leonard C. Suchyta, Esq.; Joel Wall, Esq.; Finnegan, Henderson, Farabow et al.

(57) ABSTRACT

A method and system for controlling congestion in an IP network comprises the steps of preallocating, for a predetermined interval of time, a set of burst access parameters to a set of predetermined routes between a set of source node and destination node pairs in the IP network, and controlling, at the burst level, the traffic at each source node based on the preallocated set of burst access parameters and without communicating with other nodes in the IP network. Specifically, a network controller, for a predetermined interval of time, determines a set of routes between each source-destination node pair in the network, preallocates a set of maximum permitted rates to the predetermined set of routes, respectively, and pre-assigns a set of burst access thresholds to a set of service classes, respectively, in the predetermined routes, where the pre-assigned burst access thresholds are less than or equal to the corresponding preallocated maximum permitted rates. Based on the maximum permitted rates and the burst access thresholds, each source node in the network then controls, at the burst level, the traffic accessing the network and reserves for each admitted burst the burst peak packet rate on a predetermined route, without communicating with other nodes in the network. A source node admits an arrived burst onto a predetermined route when a total reserved peak packet rate for all bursts on the predetermined route that are in progress at the source node plus a peak packet rate of the burst is less than the identified burst access threshold. Otherwise, the source node prevents the burst from accessing the network.

4 Claims, 5 Drawing Sheets

U.S. PATENT DOCUMENTS

| | | |
|---|---|---|
| 5,231,631 A | 7/1993 | Buhrke et al. ................. 370/60 |
| 5,377,327 A | 12/1994 | Jain et al. .................... 395/200 |
| 5,572,678 A | 11/1996 | Homma et al. ........ 395/200.12 |
| 5,634,006 A | 5/1997 | Baugher et al. ....... 395/200.06 |
| 5,636,212 A | 6/1997 | Ikeda .......................... 370/233 |
| 5,668,951 A | 9/1997 | Jain et al. .............. 395/200.65 |
| 5,699,346 A | 12/1997 | Vandervort ................. 370/233 |
| 5,812,526 A | 9/1998 | Chang et al. ................ 370/230 |
| 6,405,257 B1 * | 6/2002 | Gersht ........................ 709/235 |

OTHER PUBLICATIONS

Alexander Gersht and Kyoo Jeong Lee, "Virtual–Circuit Load Control in Fast Packet–Switched Broadband Networks," IEEE, CH2535–3/88/0000–0214, 1988.

* cited by examiner

METHOD AND SYSTEM FOR BURST CONGESTION CONTROL IN AN INTERNET PROTOCOL NETWORK

CROSS-REFERENCE TO RELATED APPLICATIONS

The present application is a continuation under 37 CFR §1.53(b) of U.S. application Ser. No. 09/141,941, filed Aug. 27, 1998, now U.S. Pat. No. 6,405,257; which is a continuation-in-part of U.S. application Pat. No. 09/105,905, filed Jun. 26, 1998 now abandoned, both of which are incorporated herein by reference.

BACKGROUND OF THE INVENTION

1. Field of the Invention

The present invention relates to Internet Protocol (IP) networks, and more particularly, to methods and systems for congestion avoidance in IP backbone networks.

2. Background of the Art

A communications network generally includes a plurality of nodes interconnected by transmission links (or "links"), which are defined by a specific bandwidth (or capacity). In an IP network, a source node transmits data in the form of packets to a destination node through a route, which may traverse zero or more nodes (i.e., switches, routers, bridges, etc.) between the source node and the destination node. The packets may include any type of digitized information, including audio, computer data, video, multimedia, etc. There are several protocols that IP networks, for example the Internet, generally use for transporting data between nodes in the network. One such protocol is the Transmission Control Protocol (TCP).

A TCP/IP network uses a congestion control technique known as Congestion Avoidance Algorithm (CAA). In such a network, nodes use packet losses in the network as congestion indicators and, based on these indicators, adjust their rate of packet transmission. An end node maintains a congestion window based on the congestion indicators that it receives from the network. The node maintains its congestion window size below a maximum segment size per round trip time, and reduces the congestion window size by half each time the source node receives a congestion indicator.

However, random packet losses, which generally have relatively short durations, can cause significant throughput degradation for network services operating in a high bandwidth-delay product regime. Furthermore, in wide area networks, because of long propagation delays, a node cannot adequately track congestions occurring at, for example, a destination node. As a result, the node may significantly decrease its congestion window size, even though the congestion at the destination node no longer exists, resulting in an inefficient allocation and use of network capacity.

Thus, it is desirable to have a method and system for addressing the above and other disadvantages of the existing congestion control avoidance methods for bursty traffic in IP networks.

SUMMARY OF THE INVENTION

Methods and systems consistent with the present invention control congestion in an IP network by preallocating, for a predetermined interval of time, a set of burst access parameters to a set of predetermined routes between a set of source node and destination node pairs in the IP network, and controlling, at the burst level, the traffic at each source node based on the preallocated set of burst access parameters and without communicating with other nodes in the IP network. Specifically, the network controller determines, for a predetermined interval of time, a set of routes between each source-destination node pair in the network, preallocates a set of maximum permitted rates to the preallocated set of routes, respectively, and preassigns a set of burst access thresholds to a set of service classes, respectively, in the predetermined routes, where the pre-assigned burst access thresholds are less than or equal to the corresponding preallocated maximum permitted rates.

Each source node in the network then controls, at the burst level, the external traffic directed to the source node based on the preallocated set of maximum permitted rates and the preassigned set of burst access thresholds and without communicating with other nodes in the network. Specifically, each source node detects the beginning of a burst in the traffic that is accessing that source node. From the predetermined set of routes between the source-destination node pair and based on the peak packet rate, service class, and quality of service (QoS) requirements of the detected burst, the source node identifies a predetermined route for the burst. The source node then identifies the burst access threshold that corresponds to the service class of the burst. The source node admits the detected burst onto the identified predetermined route when a total reserved peak packet rate for all bursts that are in progress in the identified predetermined route plus a peak packet rate of the detected burst is less than the identified burst access threshold. Otherwise, the source node prevents the detected burst from accessing the network.

Methods and systems consistent with the present invention provide a facility for engineering a set of burst access parameters, subject to network capacity, burst rejection quality of service requirements, and conservation flow constraints, such that a total weighted rate of burst rejections in an IP network is minimized. Specifically, the network computes a maximum permitted rate for each predetermined route in the network. Based on the computed maximum permitted rates, the network computes the estimated loads associated with each service class in each predetermined route. Furthermore, based on the computed set of maximum permitted rates and the computed set of estimated loads, the network computes a set of burst access thresholds.

BRIEF DESCRIPTION OF THE DRAWINGS

The above summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

In the Figures.

DETAILED DESCRIPTION

Figure 1:
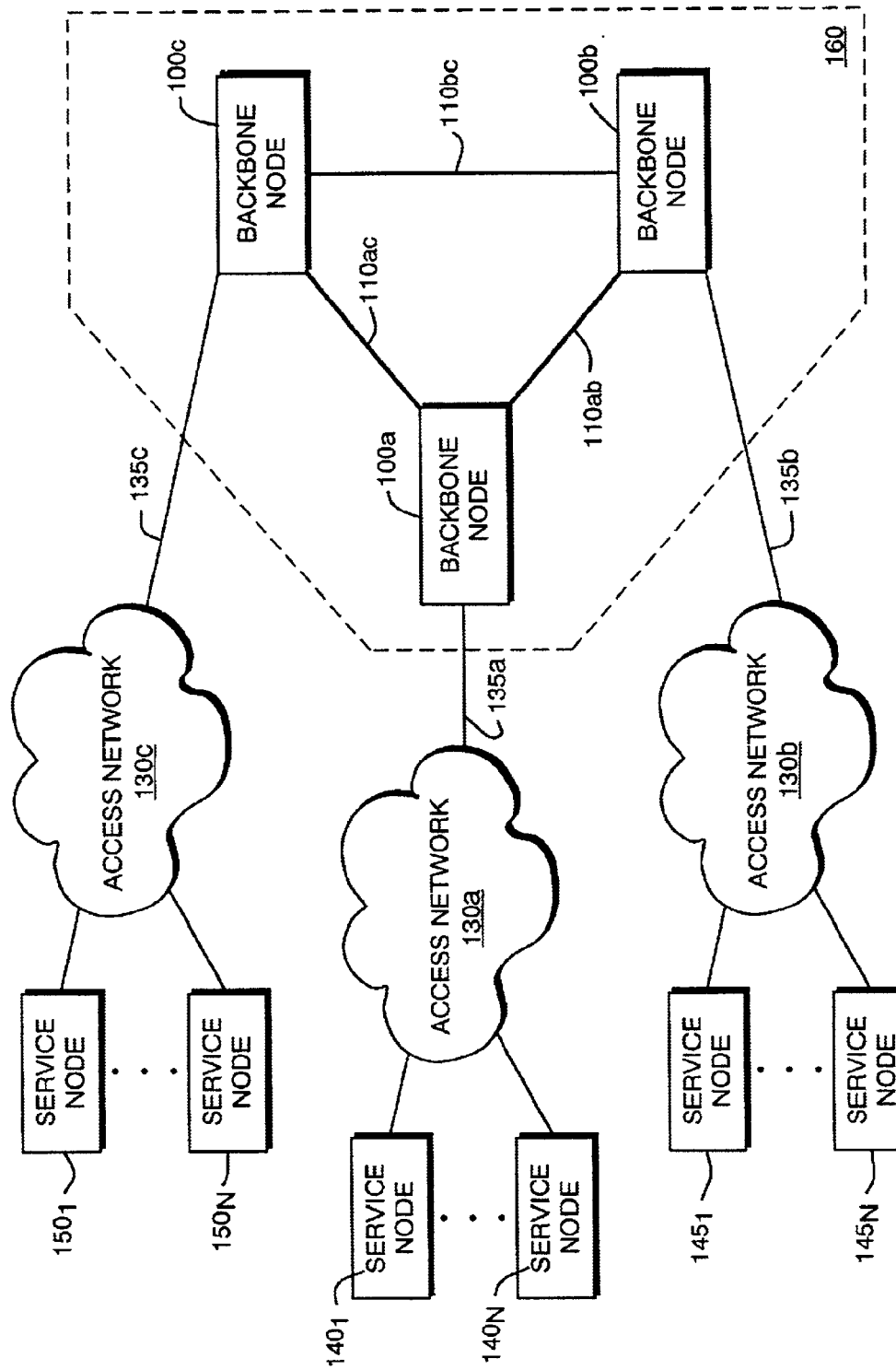
FIG. 1 is a block diagram of an IP backbone network in accordance with an embodiment of the invention.

The following description of embodiments of this invention refers to the accompanying drawings. Where appropriate, the same reference numbers in different drawings refer to the same or similar elements.

Methods and systems consistent with the present invention preallocate, for a predetermined interval of time, a set of burst access parameters to a set of predetermined routes between a set of source node and destination node pairs in the IP network. The method and systems control, at the burst level, the traffic at each source node based on the preallocated set of burst access parameters and without communicating with other nodes in the IP network. Specifically, a network controller, for a predetermined interval of time, predetermines a set of routes between each source-destination node pair in the network, preallocates a set of maximum permitted rates to the predetermined set of routes, respectively, and pre-assigns a set of burst access thresholds to a set of service classes, respectively, in the predetermined routes, where the pre-assigned burst access thresholds are less than or equal to the corresponding preallocated maximum permitted rates. The network controller may adjust the predetermined routes, the maximum permitted rates, and the burst access thresholds in, for example, hourly intervals to adapt to changes in traffic demand. In addition, in emergency situations caused by, for example, network element failure or focused overload, the network controller may also pre-determine new set of routes.

A burst controller in each source node then controls the traffic, at the burst level, based on the preallocated set of maximum permitted rates and the pre-assigned set of burst access thresholds and without communicating with other nodes in the network. Specifically, each burst controller detects the beginning of a burst in the external traffic that is accessing a source node, identifies a predetermined route for the detected burst based on the peak packet rate, service class, the QoS requirements of the burst, and routing procedures. Furthermore, each burst controller identifies the burst access threshold that corresponds to the service class.

If a total reserved peak packet rate for all bursts that are in progress in the identified predetermined route plus a peak packet rate of the detected burst is less than the identified burst access threshold, the burst controller admits the detected burst onto the identified predetermined route. Otherwise, the burst controller prevents the detected burst from accessing the network. If the burst controller admits the detected burst, the burst controller reserves on the identified predetermined route a bandwidth equal to the burst peak packet rate. When the last packet in the burst leaves the source node, the burst controller releases the reserved bandwidth on the predetermined route.

Methods and systems consistent with the present invention engineer, for a predetermined time, a set of burst access parameters, subject to network capacity, burst rejection quality of service requirements, and conservation flow constraints, such that a total weighted rate of burst rejections in a network is minimized. Specifically, based on an estimated offered load, the network controller computes a set of maximum permitted rates for each predetermined route in the network. Using the computed maximum permitted rates, the network controller computes estimated loads associated with each service class in each predetermined route. Furthermore, based on the computed set of maximum permitted rates and the computed set of estimated loads, the network controller computes a set of burst access thresholds.

A source node is defined herein as a node in an IP network that receives traffic from external networks, for example an access network or a world wide web server, and that directs the traffic through zero or more nodes via a predetermined route to a destination node in the IP network. A destination node herein is defined as a node in an IP network that receives traffic from one or more source nodes as defined herein, and directs the traffic to external networks, for example access networks, or end users. A burst is generally and broadly defined herein as a stream of consecutive packets in a traffic stream, where each packet is separated by a time interval that is statistically significantly shorter than the silent periods in the traffic stream. A bursty traffic stream may generally include one or more streams of consecutive packets.

FIG. 1 is a block diagram of an IP backbone network 160 in accordance with an embodiment of the invention. Network 160 comprises backbone nodes 100a–100c, network controller 120 (not shown), transmission links (or "links") 110ab, 110ac, and 110ab. Nodes 100a through 100c may include, for example, a backbone switch or backbone router. Network controller 120 may, for example, have a distributed architecture, and reside at nodes 100a–100c. Alternatively, some of the functionalities of network controller 120 may be performed, for example, centrally by node 100a, while other functionalities, for example offered load estimation, may be performed in a distributed fashion by nodes 100a–100c.

Node 100a connects to nodes 100b and 100c via transmission links 110ab and 110ac, respectively. Node 100b connects to node 100c via transmission link 110bc. Nodes 100a–100c also connect to external access networks 130a–130c via transmission links 135a–135c, respectively. Access network 130a, 130b, and 130c connect to service nodes $140_1$–$140_N$, $145_1$–$145_N$, and $150_1$–$150_N$, respectively. Each of service nodes $140_1$–$140_N$, $145_1$–$145_N$, and $150_1$–$150_N$ may include equipment, which generate traffic in form of, for example, voice, data, and/or video.

Figure 2:
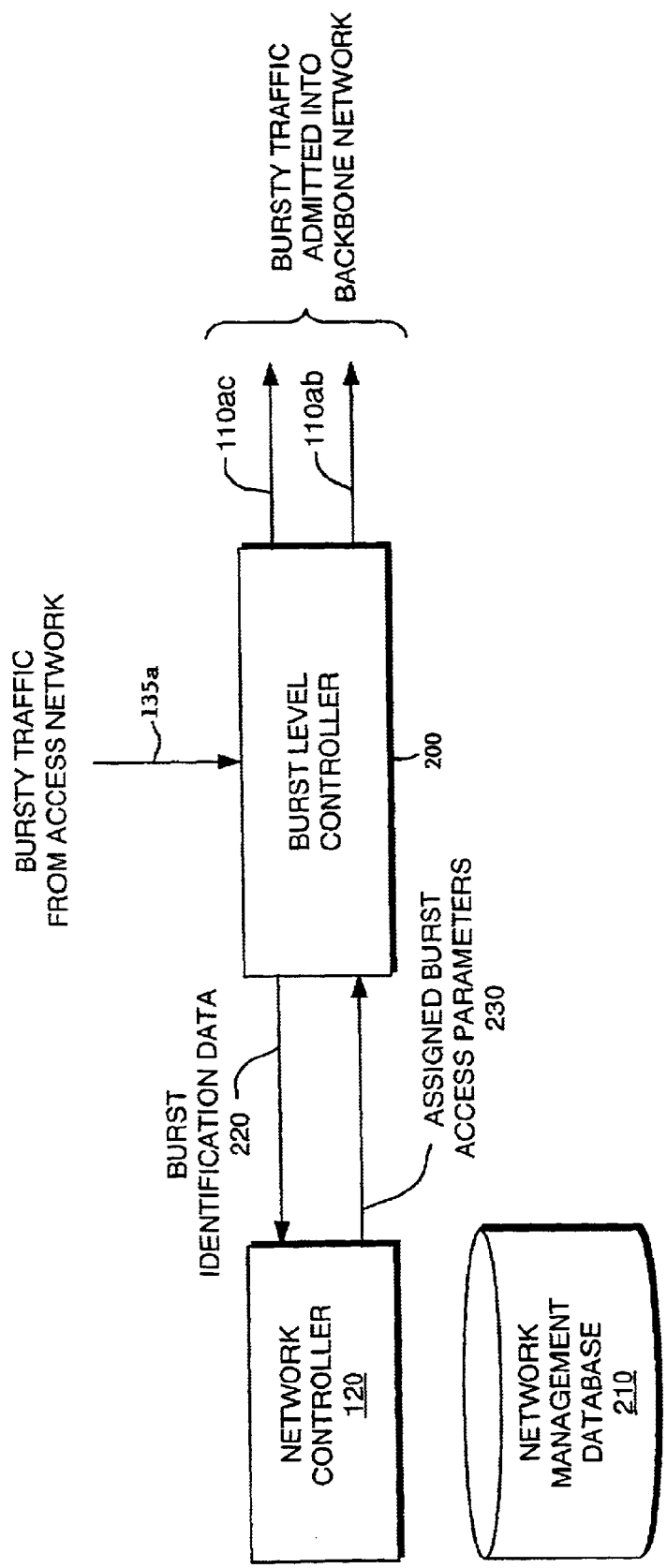
FIG. 2 is a block diagram of the interaction between a network controller and a burst level controller in an IP backbone network in accordance with an embodiment of the invention.

FIG. 2 is a block diagram of the interaction between network controller 120 and a burst level controller 200 in node 100a in accordance with an embodiment of the invention. As shown burst level controller 200 receives traffic from access network 130a via link 135a. Burst level controller 200 then sends burst identification data 220 to network controller 120, and receives burst access parameters 230 from network controller 120. Burst identification data 220 may include, for example, the time when a burst begins, the time when the burst ends, the peak packet rate, service class, and the route associated with the burst.

Figure 3:
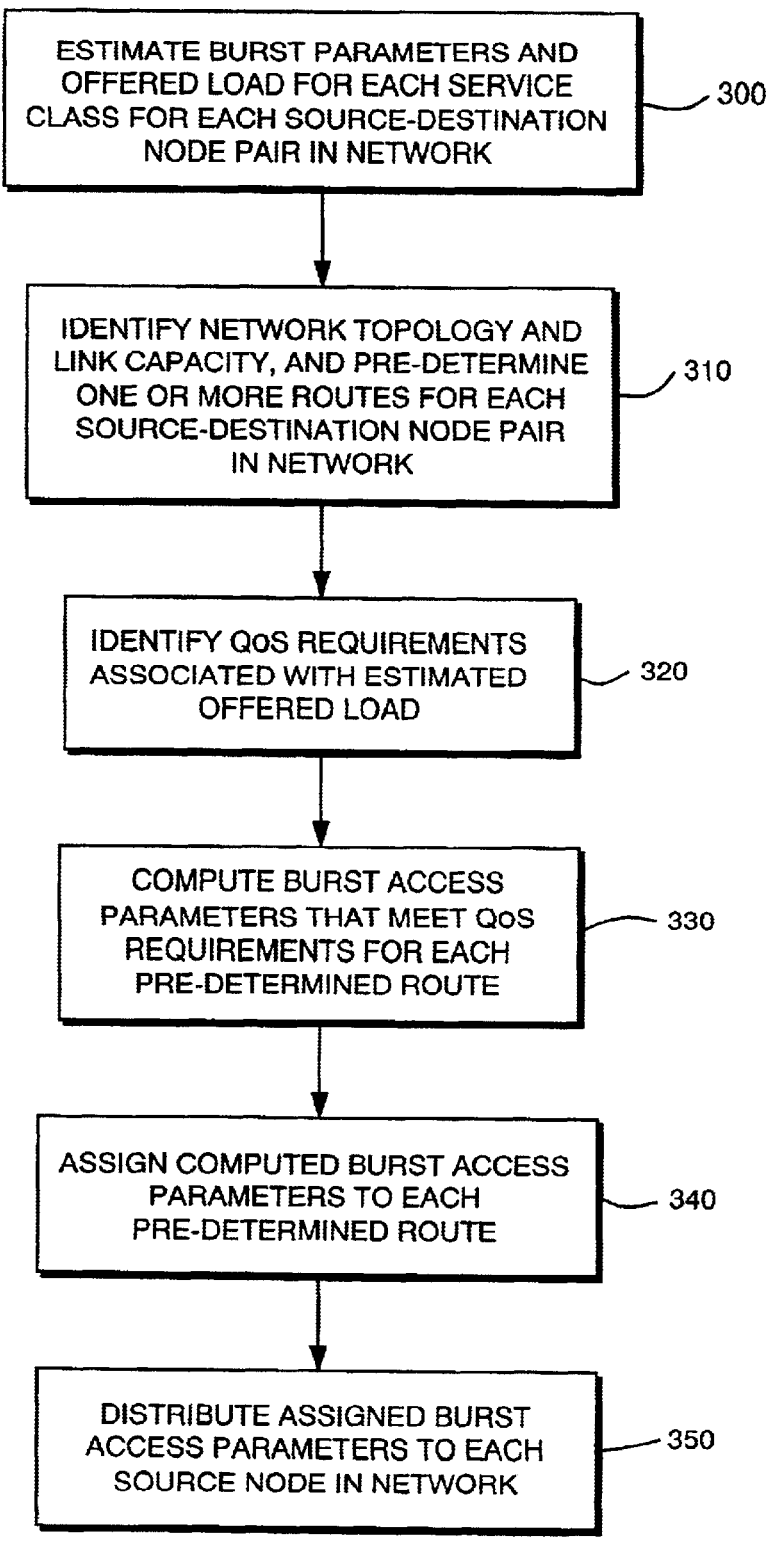
FIG. 3 is a flow chart of the steps that a network controller performs in accordance with an embodiment of the invention.

FIG. 3 is a flow chart of the steps that network controller 120 performs in accordance with an embodiment of the invention. Network controller 120 estimates the offered load and the burst parameters associated with each service class for each source-destination node pair in network 160 (step 300). An estimated offered load on the burst level is the sum of estimated mean of the number of admitted bursts and of estimated mean of the number of rejected bursts. An estimated offered load on the packet level is the sum of estimated mean of the number of packets per unit of time (for example, per second) admitted and of estimated mean of the number of packets per unit of time rejected. For each service class, the estimated burst parameters include the mean duration of bursts and the peak packet rate of the bursts corresponding to the estimated offered load.

Network controller 120 also identifies the topology of network 160 and capacity (or bandwidth) of links 110ab, 110ac, and 110bc, and determines a set of routes for each source-destination node pair in network 160 (step 310). Each predetermined route may span one or more links. For example, network 160 may establish between source node 100a and destination node 100c a route consisting of links 110ab and 110bs. Similarly, network 160 may establish between source node 100a and destination node 100c another route consisting of link 110ac.

Network controller 120 identifies the quality of service (QoS) requirements associated with the estimated offered loads for each source-destination node pair (step 320). The QoS requirements may include, for example, the bandwidth made available on each predetermined route, packet delay, maximum packet loss rates, and limits on burst rejections. Network controller 120 computes a set of burst access parameters that meet the identified QoS requirements for each predetermined route between the source-destination node pairs (step 330). The set of burst access parameters include a set of maximum permitted rates assigned to a set of predetermined routes between each source-destination node pair, respectively, and a set of burst access thresholds assigned to the service classes in each of the predetermined routes. Network controller 120 assigns the computed burst access parameters to each predetermined route between the source-destination node pairs (step 340). Network controller 120 then distributes the assigned burst access parameters to each source node in network 160 (step 350).

Figure 4:
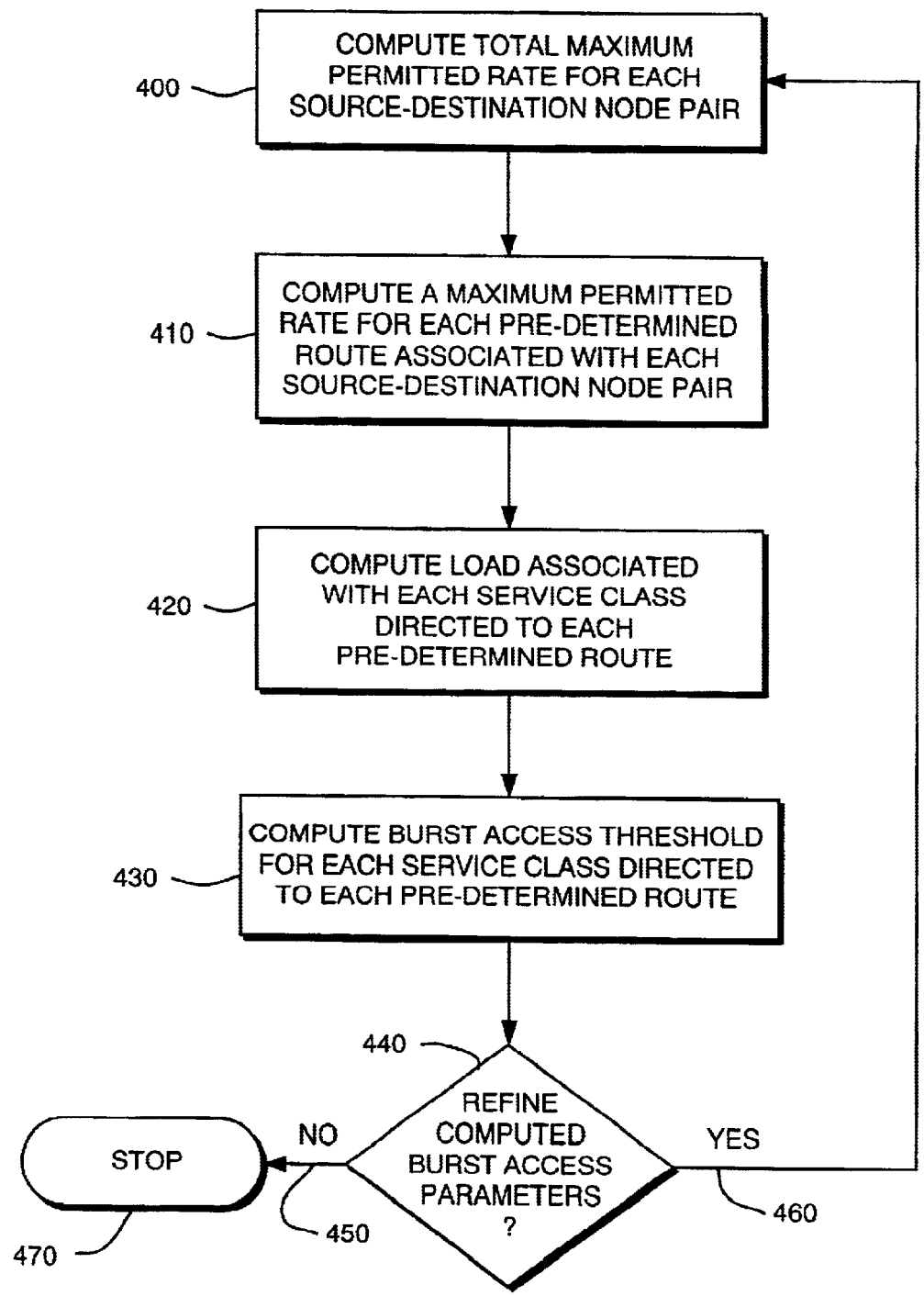
FIG. 4 is a flow chart of the steps that a network controller performs to compute burst access parameters in accordance with an embodiment of the invention.

FIG. 4 is a flow chart of the steps that network controller 120 performs to compute a set of burst access parameters, subject to network capacity, QoS burst rejection requirements, and conservation flow constraints, such that a total weighted rate of burst rejections in network 160 is minimized in accordance with an embodiment of the invention. Network controller 120 computes a total maximum permitted rate (MPR) for each source-destination node pair (step 400). Network controller 120 then computes a maximum permitted rate, for example in units of packets per second, for each predetermined route between each source-destination node pair (step 410). Based on the computed maximum permitted rates in step 410, network controller 120 then computes an estimated load associated with each service class in each predetermined route (step 420). The estimated load is a fraction of the offered load that network controller 120 assigns to each predetermined route between source-destination pairs in network 160. Based on the maximum permitted rates computed in step 410 and the estimated traffic loads computed in step 420, network controller 120 then computes a burst access threshold, for example in unit of packets per second, for each service class in each predetermined route (step 430).

Network controller 120 also determines whether the burst access parameters computed in steps 400–430 need further refinement (step 440). If the computed burst access parameters require further refinement (step 460), then network controller 120 computes a new set of burst access parameters by repeating steps 400–430. If the computed burst access parameters do not require further refinement (step 450), then network controller 120 does not compute a new set of burst access parameters (step 470).

Figure 5:
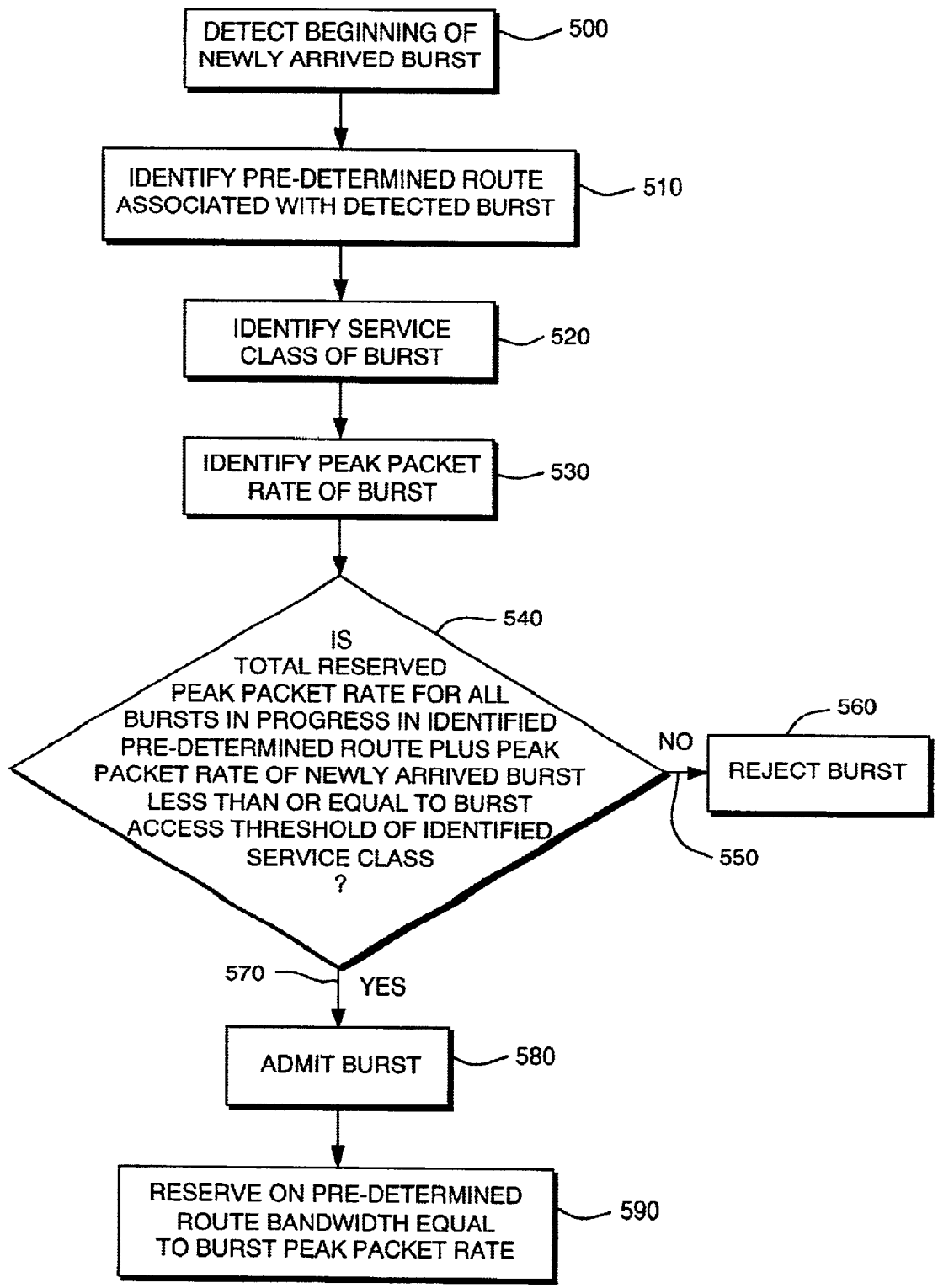
FIG. 5 is a flow chart of the steps that a burst level controller performs to control bursty traffic in accordance with an embodiment of the invention.

FIG. 5 is a flow chart of the steps that burst level controller 200 performs to control traffic at source node 100a in accordance with an embodiment of the invention. Burst level controller 200 detects the beginning of a newly arrived burst (step 500). For example, burst controller 200 may detect the beginning of the burst from the existence of a token in the traffic stream. In the embodiment of FIG. 1, a server in access network 130a may insert the tokens in the traffic generated by each service node, where each token includes the destination of the respective burst, peak packet rate of the burst, and the QoS requirements of the burst.

Burst level controller 200 identifies the service class (step 520), the peak packet rate (step 530), and the QoS requirements associated with the detected burst, and identifies a predetermined route (step 510) according to routing procedures. Burst level controller 200 then determines whether the total reserved peak packet rate for all bursts in progress in the identified predetermined route plus the peak packet rate of the detected burst is less than or equal to the burst access threshold of the identified service class (step 540). If burst level controller 200 determines that the total reserved peak packet rate for all bursts in progress in the identified predetermined route plus the peak packet rate of the detected burst is not less than or equal to the burst access threshold of the identified service class (step 550), then burst level controller 200 rejects the burst from network 160 (step 560). Burst controller 200 may reject the burst by, for example, sending to the server in access network 130a a negative acknowledgment, discarding the burst, or temporarily throttling the server.

If burst level controller 200 determines that the total reserved peak packet rate for all bursts in progress in the identified predetermined route plus the peak packet rate of the detected burst is less than or equal to the burst access threshold of the identified service class (step 570), then burst level controller 200 admits the detected burst onto the identified predetermined route (step 580). Burst level controller 200 then reserves for the identified predetermined route a bandwidth equal to the peak packet rate of the detected burst (step 590).

When burst level controller 200 detects the end of the detected burst, burst level controller 200 subtracts the peak packet rate of the detected burst from the total reserved peak packet rate for all bursts in progress in the identified predetermined route. Burst controller 200 may detect the end of the burst from the existence of a burst-end token in the traffic stream.

Traffic Model

In accordance with an embodiment of the present invention, a traffic directed to network 160 may include bursts that are separated by silent time intervals, which are modeled in network controller 120 by a Poisson distribution. Specifically, the packets in each burst may be separated by time intervals that are statistically much shorter than the silent time intervals. Accordingly, the packet inter-arrival rate may be much smaller than the burst inter-arrival rate, and the probability that the packet inter-arrival time exceeds the average burst inter-arrival time may be small. Thus, the minimum packet inter-arrival time is limited by the reverse of the burst peak packet rate.

The number of packets in a burst (or the burst length) may be represented as a random variable L, which may have an infinite variance (i.e., heavy-tail property). A Poreto distribution is one example of a probability distribution with an infinite variance, which may be represented as follows:

$$P(L = n) = \frac{b}{n^{(2+a)}},$$

where 1>a>0, and b is a normalized constant, such that $$\sum_{n=1}^{\infty} \frac{b}{n^{(2+a)}}.$$

Parameter a may be represented as a monotonically decreasing function of the average burst length, which may be represented as follows:

$$\bar{L} = \sum_{(n=1n)}^{\infty} \frac{b}{(1+a)}.$$

Furthermore, in the case of traffic that includes multiple classes of service, parameter a, b, and $\bar{L}$ may be expressed as a function of service class k as follows:

a=a(k), b=b(k) and $\bar{L}=\bar{L}(k)$, where k=1,2, . . . , K.

Burst Rejection Probabilities

Network controller 120 computes the burst rejection probabilities in network 160 based on the following parameters:

A(v, k)—estimated burst arrival rate of service class k at the source node of a source-destination node pair v, for example, source node 100a and destination node 100c;

u(v)—estimated total load on the burst level offered to a source-destination node pair v;

u(v, k)—service class k estimated load offered on the burst level to source-destination node pair v;

u(v, k, s)—service class k estimated load on the burst level offered to a predetermined route s between a source-destination node pair v;

p(v, k, s)—fraction of class k bursts that arrive at the source node of a source-destination node pair v and are routed on a predetermined route s between the source-destination node pair v, where $\Sigma p(v, k, s)=1$ for $p(v, k, s) \geq 0$;

B(v, k, s)—probability of rejection of a service class k burst from a predetermined route s between source-destination node pair v;

d(k)—QoS requirement limiting the rejection rate of a service class k burst from a predetermined route s between a source-destination node pair v;

M(v, s)—maximum permitted rate for a predetermined route s between a source-destination node pair v;

q(v, k, s)—burst access threshold associated with service class k, where $0 \leq q(v, k, s) \leq M(v, s)$;

R(v, s)—total reserved peak packet rate for all bursts in progress in a predetermined route s between a source-destination node pair v;

R(v, k, s)—service class k estimated load on the packet level offered on a predetermined route s between source-destination node pair v;

F(R, v, s)—probability that R(v, s) equals R, where $0 \leq R \leq M(v, s)$;

T(k)—estimated mean burst duration;

r(k)—peak packet rate of burst associated with service class k.

Network controller 120 estimates load u(v, k) offered to source-destination node pair v in terms of the burst arrival rate (A(v, k)) of service class k at the source node of a source-destination node pair v and mean burst duration (T(k)) as follows:

$$u(v, k) = A(v, k)T(k)$$

Similarly, network controller 120 estimates load u(v, k, s) offered on a predetermined route s between a source-destination node pair v in terms of the burst arrival rate (A(v, k)) of service class k at the source node of a source-destination node pair v, mean burst duration (T(k)) and the fraction of class k bursts (p(v, k, s)) that arrive at the source node of the source-destination node pair v and are routed on the predetermined route s between the source-destination node pair v as follows:

$$u(v, k, s) = A(v, k)p(v, k, s)T(k) \tag{1}$$

$$\overline{R}(v, k, s) = u(v, k, s)r(k).$$

Network controller 120 computes the probability distribution of the total reserved peak packet rate for all bursts in progress in a predetermined route s between a source-destination node pair v. In an embodiment where each q(v, k, s) is preset to M(v, s), network controller 120 computes F(R, v, s)) and B(v, k, s) using the following equations:

$$R\, F(R, v, s) = \Sigma u(v, k, s)r(k)F(R-r(k), v, s),$$

where the sum is taken over all service classes k=1, ..., K; (2)

F(x, v, s)=0, if x<0;

$\Sigma F(R, v, s)=1$, where the sum is taken from R=0 to M(v, s); and (3)

B(v, k, s)=$\Sigma F(R, v, s)$, where the sum is taken from R greater than M(v, s)−r(k) to M(v, s). (4)

Network controller 120 then recursively solves equations (2) and (3) to determine based on equation (4) the probability of rejection (B(v, k, s)) of a service class k burst from a predetermined route s between a source-destination node pair v.

In an embodiment where each q(v, k, s) is not preset to M(v, s), network controller 120 computes F(R, v, s) and B(v, k, s) using, for example, the method disclosed in A. Gersht, K. J. Lee, "Virtual-Circuit Load Control In Fast Packet-Switch Broadband Networks," Proceedings of GLOBECOM '88, December 1988, which is incorporated herein by reference.

Burst Access Parameter Engineering

In accordance with an embodiment of the present invention, network controller 120 computes the burst access parameters described in FIG. 4 (steps 400–470) as follows: Network controller 120 computes the burst access parameters so that they satisfy the QoS burst rejection requirement (d(k)) of each service class k in each predetermined route s between each source-destination node pair v in network 160, such that a total weighted rate of burst rejections in network 160 is minimized for a particular set of link capacities (or bandwidth) and QoS burst rejection requirements.

Network controller 120 computes the burst access parameters based on the following parameters:

$M_l$—total maximum permitted rate assigned by network controller 120 to link l, for example link 110ab, where $M_l = \Sigma M(v, s)$ with the sum taken over all predetermined routes s on link l.

$C_l$—total capacity (or bandwidth) of link l;

w(k)—weight assigned to service class k based on, for example, priority of service class k;

Q(v, s)—weighted rate of burst rejection on a predetermined route s between a source-destination node pair v; and Q—total weighted rate of burst rejections in network 160, where $Q = \Sigma Q(v, s)$ with the sum taken over all predetermined routes s between all source-destination node pairs v in network 160.

To compute burst access parameters, network controller 120 uses the weighted rate of burst rejection Q(v, s) on a predetermined route s between a source-destination node pair v. The weighted rate of burst rejections Q(v, s) is defined as follows:

$$Q(v, s) = \sum_{k=1}^{K} A(v, k)p(v, k, s)B(v, k, s)w(k) \tag{5}$$

Network controller 120 then minimizes the total weighted rate of burst rejections Q over the parameters M(v, s), p(v, k, s), and q(v, k, s). Specifically, for a particular A(v, k), T(k), w(k), network topology, link capacities, and a set of predetermined routes, network controller 120 minimizes Q over M(v, s), p(v, k, s), and q(v, k, s), subject to the following constraints:

QoS burst rejection constraint: $B(v, k, s) \leq d(k)$;

link capacity constraint: $M_l \leq C_l$;

conservation flow constraint: $\Sigma p(v, k, s)=1$, $p(v, k, s) \geq 0$; and burst access thresholds constraint: $0 \leq q(v, k, s) \leq M(v, s)$.

Relaxation of QoS Burst Rejection Constraint

Network controller 120 uses a penalty function method to relax the QoS burst rejection constraint. Specifically, network controller 120 uses the penalty function G(v, k, s) for non-compliance with the QoS burst rejection constraint for service class k in a predetermined route s between a source-destination node pair v as follows:

$$G(v, k, s) = g\left(\frac{B(v, k, s)}{d(k)} - 1\right)^2 \text{ if } B(v, k, s) \geq d(k),$$

and G(v, k, s)=0, otherwise, (6)

where g is a positive multiplier that determines the strength of penalty for violating the QoS burst rejection constraint, B(v, k, s)≦d(k). Similarly, network controller 120 uses the penalty function G(v, s) for non-compliance with the QoS burst rejection constraint for all service classes in a predetermined route s between a source-destination node pair v as follows:

G(v, s)=ΣG(v, k, s), where the sum is taken from k=1 to k=K.

Network controller 120 then represents a total weighted rate of burst rejections in a predetermined route s between a source-destination node pair v as follows:

$$Q^*(v, s) = Q(v, s) + G(v, s);$$ (7)

G=ΣG(v, s), where the sum is taken over all predetermined routes s between all source-destination node pairs v in network 160;

Q*=Q+G.

Then, network controller 120 minimizes Q* subject to the following constraints:
link capacity constraint: $M_l \leq C_l$;
conservation flow constraint: Σp(v, k, s)=1,p(v, k, s)≧0; and
burst access thresholds constraint: 0≦q(v, k, s)≦M (v, s).

In addition, network controller 120 decomposes the task of minimizing the total weighted rate of burst rejections Q* into three related sub-tasks, which are as follows:

sub-task (1): compute, M(v, s), the maximum permitted rates for each predetermined route s between each source-destination pair v;

sub-task (2): compute, p(v, k, s), the fraction of class k bursts that arrive at the source node of a source-destination node pair v and are routed on a predetermined route s between the source-destination node pair v; and sub-task (3): compute, q(v, k, s), the burst access thresholds for each service class k in a predetermined route s between a source-destination node pair v.

Network controller 120 performs sub-tasks (1) through (3) in a sequential fashion. For each sub-task, network controller 120 optimizes an objective function (as defined below) over each set of variables M$^t$(v, s), p$^t$(v, k, s), and q$^t$(v, k, s), respectively, while keeping the other two sets of variables fixed, where t represents a particular iteration. For example, after completing an iteration t of sub-task (1), network controller 120 uses the computed M$^t$(v, s) to compute p$^t$(v, k, s). Similarly, after completing an iteration t of sub-task (2), network controller 120 uses the computed M$^t$(v, s) and p$^t$(v, k, s) to compute q$^t$(v, k, s). Network controller may, if needed, repeat sub-tasks (1) through (3) in order to refine each computed M$^t$(v, s), p$^t$(v, k, s), and q$^t$(v, k, s).

Sub-task(1): Computation of Maximum Permitted Rates

Network controller 120 computes an estimate of M$^t$(v), the total maximum permitted rate for all predetermined routes s between each source-destination node pair v in network 160, and assigns a maximum permitted rate, M$^t$(v, s), to each predetermined route s between each source-destination node pair v such that the QoS burst rejection constraint, B$^t$(v, k, s)≦d(k), and the link capacity constraint, $M_l^t \leq C_l$, are satisfied. Specifically, network controller 120 uses an iterative procedure to compute an estimate of M$^t$(v) and assign each M$^t$(v, s) to each predetermined route s. At each iteration t, based on p$^{t-1}$(v, k, s), and q$^{t-1}$(v, k, s), which network controller 120 computes at iteration t-1, network controller 120 computes an estimated M$^t$(v) for each source-destination node pair v, and assigns M$^t$(v, s) to each predetermined route s in network 160.

Network controller 120 uses as initial estimate of M$^t$(v) the following lower bound for M$^t$(v):

$$M(v) \geq \sum_{s,k} \overline{R}(v, k, s)(1 - d(k)).$$

At an initial iteration t=0, network controller 120 initializes M(v) as follows:

M$^0$(v)=ΣR(v, k, s)(1−d(k)), where the sum is taken over all service classes k=1 . . . , K, and over all predetermined routes s between source-destination node pair v; and M$^0$(v)=ΣA(v, k)T(k)r(k)(1−d(k)), where the sum is taken over all k=1 . . . , K.

Network controller 120 then computes an M$^t$(v, s) for each predetermined route between each source-destination node pair v as follows: Network controller 120 computes a M$^t$(v, s) for each predetermined route such that the maximal link virtual residual capacity, (C$_l$−M$_l$), is minimized subject to ΣM$^t$(v, s)=M$^t$(v), where the sum is taken over all predetermined routes s in network 160 and 0≦M$^t$(v, s). Network controller 120 computes each M$^t$(v, s) by using a flow deviation method, for example, the flow deviation method disclosed in A. Gersht, A. Shulman, "Optimal Routing In Circuit-Switched Communication Networks," IEEE Transactions On Communications, Volume 37, No. 11, November 1989.

After the initial iteration at each iteration t, network controller 120 refines M$^t$(v) based on M$^{t-1}$(v), which network controller 120 computed at iteration t-1, as follows:

$$M^t(v) = M^{t-1}(v) + b^{t-1}(v),$$

where b$^t$(v) is the step size by which network controller 120 increments M$^t$(v), and b$^0$(v) equals 0. For t≧1, network controller 120 selects b$^1$(v) to be proportional to the maximum of (B(v, k, s)/d(k))−1), which is computed at iteration t−1, and where the maximum is taken over all service classes k=1, . . . , K and over all predetermined routes s between source-destination node pair v. These iterations continue until the QoS burst rejection constraint is satisfied for all classes in each predetermined route s between each source-destination node pair v. Network controller 120 then modifies b$^t$(v) to decrease Q as long as the link capacity constraint, $M_l \leq C_l$, is satisfied.

Sub-task(2): Computation of Route Load Assignments

Network controller 120 computes p$^t$(v, k, s), the fraction of class k bursts that arrive at the source node of a source-destination node pair v and that are to be routed on a predetermined route s between the source-destination node pair v, as follows: Based on the set of predetermined routes, A(v, k), T(k), r(k), w(k), and M'(v, s) computed at iteration t and thresholds $q^{t-1}$(v, k, s) computed at iteration t−1, network controller 120 computes each p(v, k, s) such that Q* is minimized, subject to Σp'(v, k, s)=1, where p'(v, k, s)≧0. At initial iteration t=0, network controller 120 computes the values of p'(v, k, s) that optimize Q* for a given set of M'(v, s) and $q^{t-1}$(v, k, s) assuming that $q^0$(v, k, s) equals $M^0$(v, s).

Network controller 120 then computes, L(v, k, s), the length of a predetermined route s between a source-destination node pair v for a service class k. Network controller 120 computes L(v, k, s) by taking a partial derivative of Q* with respect to p(v, k, s).

For any given M(v, s) and q(v, k, s) satisfying the burst access thresholds constraint, 0≦q(v, k, s)≦M (v, s), network controller 120 computes a set of p(v k, s) for each source-destination node pair v independently. Each computed p(v, k, s) has a positive value only when the corresponding predetermined routes s has a minimum L(v, k, s). From the computed p(v, k, s), network controller 120 uniquely determines Q*(v, s), and thus, Q*. If network controller 120 determines that G(v, s)=0, then the QoS burst rejection constraint is satisfied In other words, Q*(v, s) equals Q(v, s), and network controller 120 has computed for a given set of M(v, s) and q(v, k, s), the values of p(v, k, s) such that the total weighted rate of burst rejections Q is minimized subject to the QoS burst rejection constraint.

For each set of predetermined routes s, network controller 120 computes the lengths, L(v, k, s), by taking partial derivatives of Q*(v, s) with respect to p(v, k, s). Network controller 120 uses an iterative flow deviation method, subject to the link capacity constraint, to shift the offered load to predetermined routes s that have minimum lengths.

From equations (4), (5), (6), and (7), network controller 120 may compute the length of each predetermined route s, L(v, k, s), as follows:

$$L(v,k,s) = \frac{\partial Q*(v,s)}{\partial p(v,k,s)} \qquad (8)$$

$$= A(v,k)B(v,k,s)w(k) + \frac{\partial B(v,k,s)}{\partial p(v,k,s)}$$

$$\left[ A(v,k)p(v,k,s)w(k) + \frac{2g}{d(k)}Y(v,k,s) \right],$$

where $$Y(v,k,s) = \frac{B(v,k,s)}{d(k)} - 1, \text{ if } \frac{B(v,k,s)}{d(k)} \geq 1,$$

and 0, otherwise; and $$\frac{\partial B(v,k,s)}{\partial p(v,k,s)} = \sum_{R>M(v,s)-r(k)}^{M(v,s)} \frac{\partial F(R,v,s)}{\partial p(v,k,s)}.$$

In an embodiment where each q(v, k, s) is preset to M(v, s) for all service classes k and predetermined routes s, network controller 120 computes the derivatives $$Z(R,v,k,s) = \frac{\partial F(R,v,s)}{\partial p(v,k,s)}$$

jointly with F(R, v, s) as follows: For R>0, network controller 120 computes Z(R, v, k, s) based on equations (2) and (3) by taking partial derivatives from both sides of equation (2) and using equation (1):

$$RZ(R,v,k,s) = A(v,k)T(k)r(k)F(R-r(k),v,s) + \qquad (9)$$

$$\sum_l u(v,l,s)r(l)Z(R-r(l),v,k,s)$$

Network controller 120 then takes the partial derivative of F(0, v, s) to compute Z(0, v, k, s) as follows:

$$Z(0,v,k,s) = -A(v,k)T(k)(1-B(v,k,s))F(0,v,s) \qquad (10)$$

In an embodiment where each q(v, k, s) is not preset to M(v, s) for all service classes k and predetermined routes s, network controller 120 computes F(R, v, s), and thus, Z(R, v, k, s) using, for example, the method disclosed in A. Gersht, K. J. Lee, "Virtual-Circuit Load Control In Fast Packet-Switch Broadband Networks," Proceedings of GLOBECOM '88, December 1988.

Network controller 120 recursively solves equations (9) and (10) jointly with equations (2) and (3) independently for each service class by performing the following steps: (Network controller 120 uses L(v, k, s, i) and p(v, k, s, i) to represent the values of L(v, k, s) and p(v, k, s) on the $i^{th}$ iteration, respectively.)

Step 0: Network controller 120 sets p(v, k, s, i) equal to (1/n(v)), where n(v) is the number of predetermined routes s between a source-destination node pair v, and i=0.

Step 1: Network controller 120 computes L(v, k, s, i) from (8) through (10) using recursive equations (2) through (4) for p(v, k, s, i).

Step 2: Network controller 120 computes L(v k, s, i) using the equation p(v, k, s, i+1)=(1−γ(i))p(v, k, s, i)+γ(i)δ(v, k, s, i), where γ(i) represents the step size, and δ(v, k, s, i) equals 1, if L(v, k, s, i) equals the minimum value of L(v, k, m, i), where m is an index representing a predetermined route s and the minimum is taken over all predetermined routes m, and δ(v, k; s, i) equals 0, otherwise.

Step 3: Network controller 120 repeats Steps 1 and 2 until the difference between the maximum length predetermined route and the minimum length predetermined route is less than ϵ, where ϵ is a predetermined parameter.

Sub-task(3): Computation of Burst Access Thresholds

For a given set of M'(v, s), p'(v, k, s), and u'(v, k, s), network controller 120 computes a set of burst access thresholds, q'(v, k, s), such that the total weighted rate of burst rejections Q* is minimized over all q'(v, k, s) subject to the burst access threshold constraint, 0<q'(v, k, s)≦M'(v, s). At each iteration t, based on the computed values of M'(v, s) and p'(v, k, s), network controller 120 computes the values of q'(v, k, s) that minimize Q*(v, s) independently and, for example, in parallel for all predetermined routes s.

Network controller uses an optimization method, for example the method disclosed in A. Gersht, K. J. Lee, "Virtual-Circuit Load Control In Fast Packet-Switch Broadband Networks," Proceedings of GLOBECOM '88, December 1988, to compute the values of q'(v, k, s).

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A congestion control method for a network, said method comprising the steps of:

preallocating, for a predetermined interval of time, a set of burst access parameters to a set of predetermined routes between a set of source node and destination node pairs in the network and a set of thresholds for the allocated set of burst access parameters;

identifying the network topology; and controlling, at burst level, traffic at each source node in the network based on the previously allocated set of burst access parameters and the previously allocated set of thresholds such that each source node routes to at least one of the set of predetermined routes when values for the allocated set of burst access parameters do not exceed corresponding values for the allocated set of thresholds without requiring approval from other nodes within the network.

2. A congestion control method for a network, said method comprising the steps:

determining for a predetermined interval of time, a set of routes between a set of source node and destination node pairs in the network;

preallocating, for the predetermined interval of time, a set of maximum permitted rates to the determined set of routes, respectively;

assigning, for the predetermined interval of time, a set of burst access thresholds to a set of service classes, respectively, wherein the assigned burst access thresholds are less than or equal to the corresponding allocated maximum permitted rates;

identifying the network topologly; and controlling, at burst level, traffic accessing each of the source nodes based on the previously allocated set of maximum permitted rates and the previously assigned set of burst access thresholds without requiring approval from other nodes within the network.

3. A method for avoiding congesting in a network, said method comprising the steps:

determining, for a predetermined interval of time, a set of routes between a set of source node and destination node pairs in the network;

preallocating, for the predetermined interval of time, a set of maximum permitted rates to the determined set of routes, respectively;

identifying the network topology; and controlling, at burst level, traffic accessing each of the source nodes based on the previously allocated set of maximum permitted rates without requiring approval from other nodes within the network.

4. A system for controlling congestion in a network, said system comprising:

a network controller for preallocating, for a predetermined interval of time, a set of burst access parameters to a set of predetermined routes between a set of source node and destination node pairs in the network and for identifying the network topology; and a burst level controller for controlling, at burst level, traffic at each source node in the network based on the preallocated set of burst access parameters without requiring approval from other nodes within the network.

* * * * *